(12) United States Patent
Sepe (10) Patent No.: US 12,222,712 B2
(45) Date of Patent: Feb. 11, 2025

(54) HYBRID RISK MODEL FOR MAINTENANCE OPTIMIZATION AND SYSTEM FOR EXECUTING SUCH METHOD

(71) Applicant: Nuovo Pignone Tecnologie—SRL, Florence (IT)

(72) Inventor: Marzia Sepe, Florence (IT)

(73) Assignee: Nuovo Pignone Tecnologie—SRL, Florence (IT)

( * ) Notice: Subject to any disclaimer, the term of this patent is extended or adjusted under 35 U.S.C. 154(b) by 0 days.

(21) Appl. No.: 17/905,288

(22) PCT Filed: Mar. 3, 2021

(86) PCT No.: PCT/EP2021/025089
§ 371 (c)(1),
(2) Date: Aug. 30, 2022

(87) PCT Pub. No.: WO2021/175493
PCT Pub. Date: Sep. 10, 2021

(65) Prior Publication Data
US 2023/0106311 A1 Apr. 6, 2023

(30) Foreign Application Priority Data
Mar. 4, 2020 (IT) .......................... 102020000004573

(51) Int. Cl.
*G05B 23/02* (2006.01)
(52) U.S. Cl.
CPC ....... *G05B 23/0283* (2013.01); *G05B 23/024* (2013.01); *G05B 23/0281* (2013.01)

(58) Field of Classification Search
CPC .............. G05B 23/0283; G05B 23/024; G05B 23/0281; G05B 23/0275;
(Continued)

(56) References Cited

U.S. PATENT DOCUMENTS 10,296,832 B1 * 5/2019 Segev .................... G06F 16/283
10,417,843 B2 * 9/2019 Pettre ..................... G07C 5/085
(Continued)

FOREIGN PATENT DOCUMENTS

JP      2009251822 A    10/2009
JP      2010504501 A     2/2010
(Continued)

OTHER PUBLICATIONS

Piero Baraldi et al: "A modified Auto Associative Kernel Regression method for robust signal reconstruction in nuclear power plant components", Sep. 14, 2014 (Sep. 14, 2014), XP055747279.

(Continued)

*Primary Examiner* — Eyob Hagos
(74) *Attorney, Agent, or Firm* — Paul Frank + Collins P.C.

(57) ABSTRACT

A computer implemented method for the maintenance optimization of a fleet or group of turbomachinery assets is disclosed. The method comprises the step of model training and setup, aiming at setting configurations parameters, that can be executed offline, and the step of online calculation on new input data, which is based on detected data and extracted statistical features. An anomaly identification and classification follow, thus calculating a risk assessment, for estimating the risk that an anomaly might cause any event that requires a maintenance task to be executed on one or more assets of the fleet.

13 Claims, 3 Drawing Sheets

(58) Field of Classification Search
CPC ........... G05B 2219/34082; G05B 2219/36039; G05B 2219/32234; G05B 23/0235; G06N 20/00; Y02P 90/80
See application file for complete search history.

(56) References Cited

U.S. PATENT DOCUMENTS

| | | |
|---|---|---|
| 2008/0071501 A1 | 3/2008 | Herzog |
| 2012/0290104 A1 | 11/2012 | Holt et al. |
| 2014/0195184 A1 | 7/2014 | Maeda |
| 2017/0364818 A1* | 12/2017 | Wu .................... G06F 11/3006 |
| 2018/0107203 A1* | 4/2018 | Hagen .................... F16N 29/00 |
| 2018/0170580 A1 | 6/2018 | Gouby et al. |
| 2019/0012553 A1 | 1/2019 | Maruchi et al. |
| 2019/0130659 A1 | 5/2019 | Ide et al. |
| 2019/0180527 A1 | 6/2019 | Segal et al. |
| 2021/0190638 A1* | 6/2021 | Augustyniak ........ G07C 5/0816 |
| 2023/0028886 A1* | 1/2023 | Zhang .................... G06N 20/10 |

FOREIGN PATENT DOCUMENTS

| | | |
|---|---|---|
| WO | 2015053774 A1 | 4/2015 |
| WO | 2018044507 A1 | 3/2018 |

OTHER PUBLICATIONS

Baraldi et al., "A modified Auto Associative Kernal Regression method for robust signa Ireconstruction in nuclear power plants components," (2014).

Brause et al. "Noise suppressing sensor encoding and neural signal orthonormalization," IEEE (Jul. 1998).

Strickland, "How IP Convergence Works," www.computer.howstuffworks.com/ip-convergence2.htm.

* cited by examiner

HYBRID RISK MODEL FOR MAINTENANCE OPTIMIZATION AND SYSTEM FOR EXECUTING SUCH METHOD

TECHNICAL FIELD

The present disclosure concerns a risk model implemented in a computer program, capable of estimating the time to maintenance using digital computer-based analytics configured to: identify anomalies on signal/system/unit behavior, classify these anomalies, and assign them a severity gradient.

More specifically, the method and system for carrying out this new and useful analysis, allow new ways of managing, scheduling and performing maintenance of complex groupings of turbomachinery assets, such as gas turbines, compressors, and the like. The commercial benefits of the solution(s) provided herein facilitate fully optimizing a maintenance scenario (scope of work and timeline) of one or more fleets of turbomachinery equipment that are monitored per user, and/or other constraints (maintenance time and cost, asset availability and reliability).

Background Art

Digital, computer-based scheduling and performing maintenance of complex groupings of turbomachinery assets, such as gas turbines, compressors and their auxiliary systems, has become a necessary edge for the users, owners and/or operators of such assets, whether installed in a plant or otherwise.

Modern technologies based permit detecting the status of an operational industrial and/or aeroderivative gas turbine almost in real time by checking the operation of sensors installed in a plant. In order to improve the maintenance of the turbomachinery assets it is desirable to predict any possible failure of a plant, so as to increase the profitability of a service system, but, in particular, to reduce any downtime risks of the plant, which would potentially cause the interruption also of public services, with very high costs.

Several known data processing systems are available that are connected, or connectable, to gas turbines. Such systems are also capable of connecting with the digital operating systems that control such gas turbine, and are capable of connecting with control systems of plants, at which such gas turbines are located, to receive or download set(s) of operating data that is used to check the status of the plant.

A processing center usually processes the data downloaded and predicts in advance, based on an appropriate analysis, any possible maintenance interventions, in order to avoid any unplanned downtime of the plant. A typical processing center comprises servers and computers, available on edge or on a cloud, capable of processing the downloaded operational data of the gas turbine(s) and/or the plant by applying appropriate computer-based methods and algorithms, some of which may be provided by the OEM (Original Equipment Manufacturer) and/or based on physics models and/or asset operability optimization models.

A standard approach for maintenance scenario modeling is to plan maintenance activities with a fixed time scheduling approach.

However, use of a single approach for time to maintenance estimation (empirical, physics-based or data driven) cannot in general provide sufficient accuracy for event prediction and maintenance planning.

The approaches and the algorithms on which the maintenance optimization methods available in the prior art are based on, due to the reduced or missing predictive accuracy, negatively affect the maintenance costs and the assets reliability and availability.

Accordingly, improved optimization maintenance methods and relevant processing system for making accurate predictions for maintaining turbomachine equipment and the related auxiliary systems would be really welcomed in the technology.

SUMMARY

Availability of engineering knowledge, fleet events experience and monitoring data allow proposing a new and useful, digital, computer-based, predictive maintenance service that can be done using or merging several approaches:
  empirical approach, based on failure mode probability assessment;
  physics modeling for failure mode progression assessment; and/or
  pure data-driven approach for anomaly detection It is believed that only Original Equipment Manufacturers ("OEMs") (being owners of monitoring data and asset design) are uniquely positioned to combine all the approaches noted above, ensuring increased accuracy in planning a maintenance event for a complicated group of turbomachinery assets (such as a fleet of gas turbines and/or compressors), sufficiently in advance of any risk of operational downtime. To optimize the maintenance scenario, the accuracy of the estimation has to be sufficient to provide effective insights to the end user, by guaranteeing the expected reliability and availability. Merging the three approaches allows optimizing the maintenance scope of work by prioritizing activities basing on asset knowledge and service data.

Therefore, the inventors propose a new and useful computer-based optimization method of managing, scheduling and/or performing maintenance of complicated groups of turbo-machinery assets. This new method has increased the accuracy by merging OEM engine specific physics modeling (OEM ownership) and a fleet-based data-driven approach that is challenging for non-OEM maintenance service providers to propose, because of their reduced operational and maintenance knowledge and their access to operational data from the turbomachinery equipment.

In one aspect, the subject matter disclosed herein is directed to a method to optimize maintenance of a complex group, or fleet of, plants and/or associated turbomachinery assets and their auxiliary systems. Each of the turbomachinery assets is configured to generate one or more parameters acquired by sensors and/or calculated by monitoring and control systems. The method includes the model setup, where the model is created and validated, and the online calculation, where the data acquired from the fleet under monitoring are processed and outputs are provided online. The online calculation method includes the steps of reading configuration parameters defined by the model setup, and acquiring/receiving the operating signals output from the sensors and/or from control systems and/or from monitoring and diagnostics service of the turbomachinery assets within at least one timeframe. The method also includes the step of extracting statistical and/or mathematical features or parameters from the operating signals, to detect one or more anomalies from the features or operating parameters of the signals on the basis of calculations set by the configuration parameters. A classification of each anomaly allows to differentiate system anomalies, so that a risk assessment step is executed for estimating the risk of any event that lead to asset/system unserviceability and/or performances below contractual agreement limit and that requires a maintenance task to be executed in order to restore asset/system serviceability and expected performance. A severity assignment step is executed on sensor anomalies, for assigning a severity to the anomalies identified as sensor malfunctions. Then the maintenance dispositions are assigned by policies defined by the maintenance service owner and are visualized in a monitor or a web service, or sent to a user and/or site operators as a file or via an alert system, such as audio or video signaling apparatus.

In addition, another aspect the subject matter disclosed herein is an offline model setup, to configure the entire system and train the calculation steps.

In another aspect, the subject matter disclosed herein concerns the method of executing risk model setup by determining asset healthy and anomalous behaviors and the related signals pattern and values, basing on OEM experience, historical fleet data and machine learning techniques.

In another aspect, the subject matter disclosed herein concerns the application of machine learning methodologies for anomaly detection, consisting of supervised and/or unsupervised techniques applied to recognize anomalous features from reference healthy features.

In another aspect, disclosed herein is that the anomaly classification step is carried out by a supervised approach consisting of a multinomial classifier that assigns a class to the anomalies basing on already identified anomalies coming from the past monitoring data and fleet issues experience.

In a further aspect, disclosed herein is that the signal batches classified as anomalous are processed by a risk assessment model, combining risk coming from systems degradation assessment and sensors anomalies severity.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

A computer-readable and executable program incorporates and uses a model or algorithm that estimates the time to maintenance for one or more turbo machinery assets and/or related equipment in an industrial plant environment (driver/driven equipment and/or auxiliary systems, as better explained below). This model is the basis for an optimized maintenance service plan aimed at minimizing asset downtime and maximizing plant production, as well as targeting expected reliability/availability requirements of end users, plant owners, and/or plant operators.

A fundamental aspect of the new and useful computer-executable program is to process signals through functional/physics based models, which are configured to assess historical and current specific asset/plant behavior, and to merge with them data-driven analytics, configured to estimate deviation with respect to expected, routine, operating behaviors of the monitored equipment, and to link such models (and/or the outputs thereof) with the related system and failure/degradation events. Examples of such system and failure/degradation events include: asset emergency shutdown and/or failed start, environmental and safety impact, asset performance degradation, plant production losses, increased asset operability cost, material degradation, and component fault.

The disclosure herein is also aiming at optimizing the maintenance scenario by means of time to event analytics and risk assessment modeling.

In one aspect, the present subject matter is directed to the fact that the model on which the maintenance optimization method is based allows detecting an anomaly with respect to an expected behavior, to assign a category and a severity degree to the anomaly, so as to forecast the anomaly trend over the future and then to calculate the time to schedule and/or perform the associated maintenance.

The anomaly detection may be achieved by machine learning techniques that are configured to define if the signal pattern is healthy or unhealthy with respect to a reference pattern. The reference pattern is tuned thanks to fleet similarity analytics, and can be estimated by a physics-based model (for example thermodynamics performances or material design properties modeling) and/or by a data-driven model (clustering of fleet data or historical unit trends). The patterns are calculated as numerical features, extracted over a batch of data (the size can be adapted). The anomaly classification is then executed by applying a multinomial regression classifier. Then the anomaly categories as identified are split in two macro groups: system and sensor anomalies. These groups are then processed by a risk model that assigns severity and probability to any event the anomaly should be related to.

Figure 1:
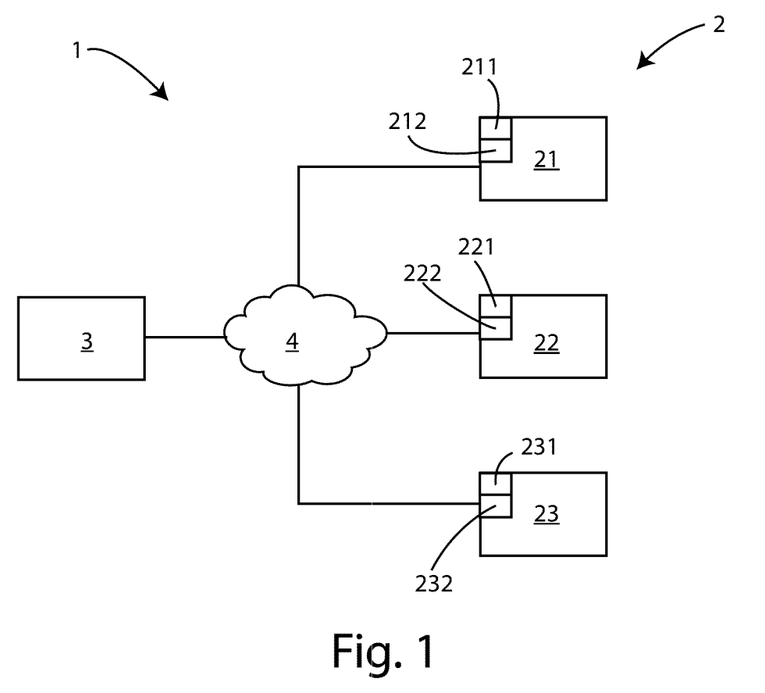
FIG. 1 is a block diagram of system showing a system configured to optimize maintenance of a fleet of turbomachinery equipment.

Referring now to the drawings, FIG. 1 shows a maintenance system, wholly indicated by reference number 1, comprising a fleet or group 2 of turbo-machinery assets to be maintained, and a control logic unit 3, where a maintenance optimization method is executed for maintaining the turbomachinery assets of the fleet 2. The control logic unit 3 is operatively connected to the fleet 2 (or "complex group of") of turbomachinery assets to be maintained by the Internet network 4. It is intended that the system, namely the control logic unit 3, can be also implemented in a cloud computing system.

The fleet 2 of turbomachinery assets comprise, by way of example, a number of gas turbines. In particular, three gas turbines 21, 22, and 23 are illustrated. It's clear that the fleet 2 to be maintained can include a different number of gas turbines 21, 22, and 23.

Each gas turbine 21, 22 or 23 includes the turbomachine itself, for the energy production, and the related auxiliary systems for their operation, such as pumps, actuators, pipelines, etc., necessary for the operation of each gas turbine 21, 22, and 23 or the turbomachinery asset in general.

In some embodiments, each gas turbine 21, 22, and 23 may be equipped with a signal acquisition module, respectively indicated with the reference numbers 211, 221, and 231, each configured to receive the detection signals, usually electric signals, from the sensors installed on the gas turbine 21, 22, and 23, and eventually to process said signals, e.g. filtering and amplifying the same before any signal is further processed.

Also, each gas turbine 21, 22, and 23 to be maintained comprises also a receiving-transmitting module 212, 222, and 232, for connecting and transmitting the signals through the Internet network 4, so as to transmit there through the collected signal of each gas turbine 21, 22, and 23 of the fleet 2. The transmission of the signals from each gas turbine 21, 22, and 23 of the fleet 2 of turbomachinery assets to be maintained to the control logic unit 3 can be made also by different channels, e.g. by radio transmission, fiber optic, and the like.

Figure 2:
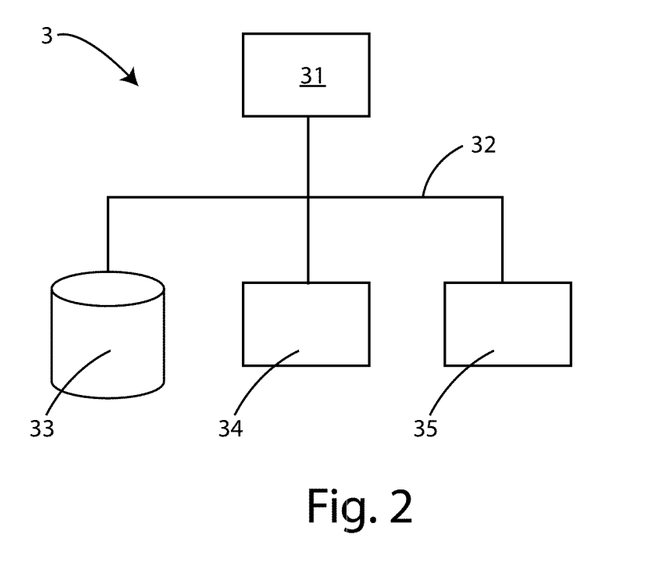
FIG. 2 is a block diagram of a central control unit, according to an embodiment.

In some embodiments, and particularly referring to FIG. 2, the central control unit 3 may comprise a processor 31, a bus 32, to which the processor 31 is connected to, a database 33, connected to the bus 32, so as to be accessed and controlled by the processor 31, a computer-readable memory 34, also connected to the bus 32, so as to be accessed and controlled by the processor 31, a receiving-transmitting module 35, connected to the bus 32, configured to receive and transmit data through the Internet network 4 from/to the corresponding receiving-transmitting module 212, 222, and 232 of the gas turbines 21, 22, and 23 to be maintained.

In some embodiment the central control unit 3 may be realized or implemented as a cloud computing system, a computer network or other installations capable of processing data by running appropriate computer programs based on a maintenance optimization method or algorithm.

The control logic unit 3 is configured to execute one or more computer programs for carrying out an optimization method for the maintenance of the fleet 2, which will be better disclosed below.

Figure 3:
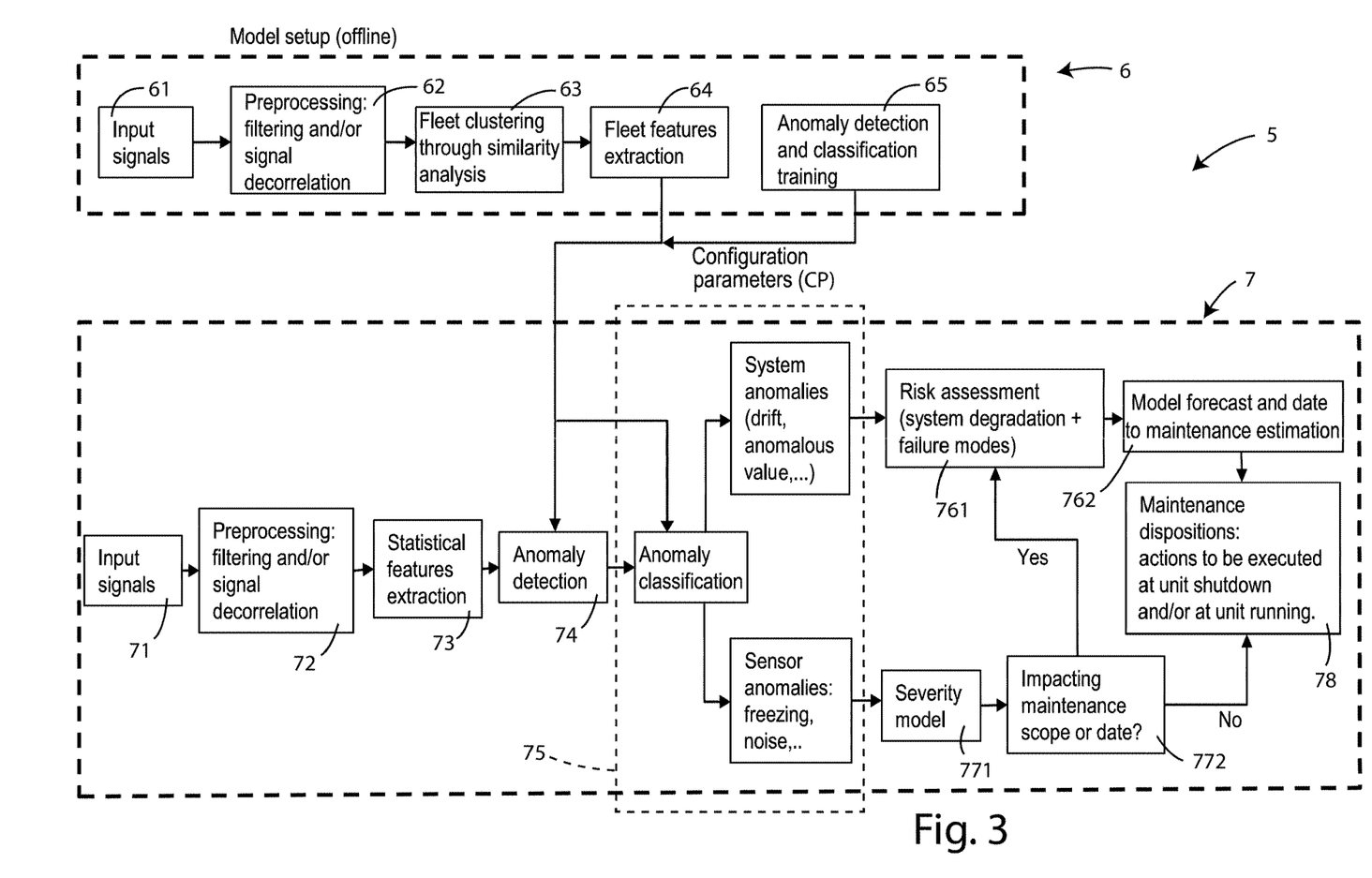
FIG. 3 is a flow chart of computer-implemented method steps that offer improved optimization of maintenance for one or more pieces of turbomachinery equipment in a plant setting, according to a first embodiment.

The maintenance optimization method/algorithm, schematically illustrated in FIG. 3, is wholly indicated by the reference number 5, and, as said, is implemented as a computer program, to be executed, as already mentioned, and by a computer or any processing means in general, possibly incorporated in the central control unit 3.

The maintenance optimization method 5 comprises two main processing steps or branches, namely a model setup step 6, which can be also executed offline, and an online management step 7.

The model setup step 6 is, as said, in general performed offline, namely not in real time or during the normal operation of the gas turbines 21, 22, and 23, at the setup phase of the method or after the asset installation and/or configuration update, like major maintenance activities or asset replacement/upgrade. The re-training of the model can be performed manually by the expert or it can be triggered by an automatic logic checking, for example when the distance of new calculated healthy features with respect to the initial ones is above a certain threshold. The offline training step 6 can be also performed on historical fleet data and it saves the configuration parameters CP that will be used by the online management step 7, as better disclosed below. In this respect, the outcome of the model setup step 6 is the set of configuration parameters CP to be used to configure the online management step 7, in order to optimize the latter to detect the anomalies of the fleet 2 of the turbomachinery assets and determine maintenance dispositions.

The offline model setup step 6 may be performed any time the model does not properly work, such that when, by way of example, the model based on the method (better described below) provides no longer acceptable outcomes, so that a re-parametrization of the model is required.

The online management step 7 mainly regards processing online data, namely collected while the gas turbines 21, 22, and 23 to be maintained are operating, so it operates while the control logic unit 3 is directly connected to the assets monitoring and communication network. The software processing capabilities have to be aligned to the data throughput, in order not to introduce delays in the infrastructure and to ensure models outcomes available in time, even in real time, to guarantee that the anomaly early detection is performed and maintenance dispositions are provided, sufficiently in advance, to plan the required on field activities.

Both the above offline model setup step 6 and the online management step 7, implemented in a suitable software language, can be performed on edge or in a remoted/cloud infrastructure, depending on the embodiment the maintenance system 1 is implemented in. The edge infrastructure is considered appropriate only if cybersecurity and encryption requirements are considered adequate by the software OEM.

In an embodiment, the offline model setup step 6 comprises an input signal sub-step 61, wherein the set of input signals from the gas turbines 21, 22, and 23 of the fleet 2 to be monitored and maintained is received. More specifically, the signals are acquired from the sensors installed on the assets for checking the operation of the same and eventually processed by a control system or other acquisition board, such as the signal acquisition module, respectively indicated for each gas turbine 21, 22, and 23 with the reference numbers 211, 221, and 231, as described above. In addition, the input dataset includes all the parameters that can be estimated from the acquired signals through data-driven analytics and/or physics-based models, like performances, consumptions, emissions, materials degradation, component distress rates, etc. . . . . . As mentioned, the processing steps can be executed on edge or on a cloud infrastructure. Sampling rate of each signals may be different.

Also, the offline model setup step 6 comprises a preprocessing sub-step 62 of the signals, wherein a filtering and/or a signal decorrelation processing is carried out, to define the window of asset operating conditions, where each signal has to be processed and/or monitored. For instance, there are signals to be observed in a certain speed range or power range, or at not running engine conditions.

Furthermore, the preprocessing sub-step 62 removes the correlation between signals of different systems, in order to define the expected behavior of the signals, independently from the asset specific operating conditions or environmental conditions. These signals will be processed by evaluating the residual between their measured values and their decorrelated expected value. An example of these residuals are the distance between the estimated material degradation and asset component aging with respect to the calculated baselines, obtained by OEM models and analytics.

After the preprocessing sub-step 62, the offline model setup step 6 comprises a fleet similarity analysis or identification sub-step 63, for identifying group of similarity within the asset fleet or group 2. For example, gas turbines 21, 22, and 23 in the same process line are usually very similar in terms of asset configuration and operational parameters. The similarity analysis is done by clustering techniques using distance or similarity metrics.

After the previous step, a calculation step or fleet or group feature extraction step 64 of the healthy features on the similarity fleets 2 identified before is executed. The features extracted are statistical/mathematical parameters. The list of features to be used depends on the type of signal. Example of features extracted are median, mean, standard deviation, percentiles, derivatives, kurtosis, skewness, signals projections on the principal components and wavelet decomposition components, obtained from a spectrum analysis. The train of the anomaly detection and classification algorithm can be executed by means of supervised and/or unsupervised approaches. In the embodiment an example of usage of mixed supervised-unsupervised approach is described. At this step, the extracted features are processed with a clustering algorithm (e.g., k-Means or Expectation Maximization algorithm, as better explained in the following), and the clusters obtained are classified in different classes (e.g., healthy, step-change, noise, asymmetric noise, spikes, drift, and abnormal range/value) by OEM experts and/or automatic algorithms based on historical experience and fleet data. In case the anomalies identified by experts are not sufficient to perform the setup of the model, anomalies are simulated and injected within the dataset and features extraction is performed again.

In some embodiments, the classification algorithm can be based on a supervised or an unsupervised approach or a mixed approach.

More specifically, the group features extraction step 64 comprises the sub-steps of identifying timeframes, over which assets operate as expected, and calculating the healthy features on every identified similarity group of the gas turbines 21, 22, and 23. Then healthy statistical/mathematical features or parameters within at least one timeframe are extracted, identifying timeframes, over which assets operate anomalously and calculating the anomalous features on every identified similarity group of the gas turbines 21, 22, and 23, extracting anomalous statistical/mathematical features or parameters within at least one timeframe. In case no sufficient number and types of anomalies are identified over the signal historical trends, the anomalies are emulated and injected within the signal trends and the anomalous features extraction step 64 is performed among the timeframes over which anomalies have been injected.

The cluster of features representative of healthy conditions is then used to train (see step 65) a features reconstruction algorithm, like AAKR (Auto-Associative Kernel Regression), able to estimate expected features of the observed signal by a weighted average of the historical features extracted on healthy signal observations. The anomaly detection is then performed by identifying as anomalous the signals features having residuals above a distance threshold. Then a classifier is trained to classify the anomalies identified with respect to the classes previous selected and identified by the experts. Statistical sampling is then executed on the healthy and anomalous features calculated over the timeframes contained within the whole training and validation period, in order to reduce features dataset size maintaining the same statistical distribution of healthy and anomalous features in all the signals.

As it can be seen, the anomaly detection is performed dynamically. The threshold of the detection depends on the specific engine condition because it uses the signal reconstruction technique.

The configuration parameters CP are the output of the offline model setup step 6, which are intended to configure the online anomaly detection step of the online calculation step 7, as better disclosed below. These parameters are, for example, the healthy and anomalous features, composition of group of similar assets, signal decorrelation curves, thresholds for risk analysis, anomaly detection and classification models parameters, fleet statistics parameters. More generally, the configuration parameters CP are constituted by healthy and anomalous features extracted within the timeframes over which the model setup step 6 is executed, and settings parameters of identification and classification models trained within model setup step 6.

The online calculation step 7 comprises the input signal sub-step 71, to define the set of input signals to be considered and in particular calculating one or more additional parameters to assess the health status of the turbomachinery assets 21, 22, and 23, selected from: performances, emissions, components degradation. This method step is analogue, or it can be the same, of the input signal sub-step 61 of the offline training step 6. The signals in both steps are acquired from the sensors installed on the assets of the fleet 2, namely in the gas turbines 21, 22, and 23, and possibly processed by control system or other acquisition board, such as the signal acquisition modules, respectively indicated with the reference numbers 211, 221, and 231 described above. In addition, the input dataset includes all the parameters that can be estimated from the acquired signals, like performances, consumptions, emissions, materials degradation, component distress rates, etc. . . . . . The processing steps can be executed on edge or on a cloud infrastructure. Also in this case, the sampling rate of each signals can be different.

Likewise the offline training step 6, the online management step 7 comprises a preprocessing sub-step 72 of the signals, for defining the window of asset operating conditions where each signal has to be processed and/or monitored. For example, there are signals to be observed in a certain speed range or power range, or at engine not running conditions. Furthermore, this sub-step removes the correlation between signals of different systems, in order to define the expected behavior of signals independently from the asset specific operating conditions or environmental conditions. These signals will be processed by evaluating the residual between their measured values with their decorrelated expected value.

In some embodiments, sub-steps 61 and 62 of the offline model setup step 6 and the sub-steps 71 and 72 of the online management step 7 can be the same and non-distinguished respectively from each other.

The configuration parameters (anomaly detection validation) are defined through comparison between healthy and unhealthy conditions identified on historical fleet data. Configuration parameters CP are extracted on timeseries, thus validation is executed through a comparison between numerical features extracted on timeseries.

Figure 4:
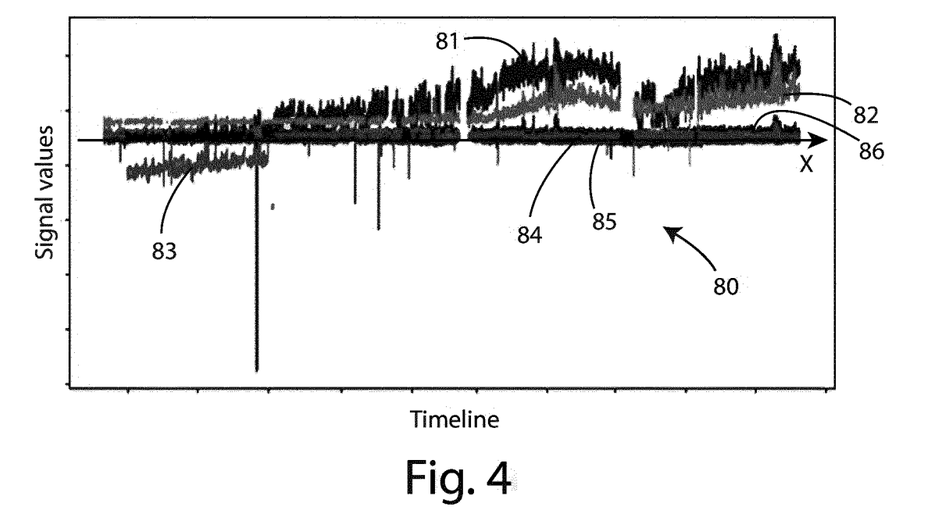
FIG. 4 illustrates a representative set of curves of decorrelated signals from sensors installed on the turbomachinery equipment of FIG. 1.

By way of example, FIG. 4 shows a set of curves 80, each one representing an operating signal taken from one of the sensors of one of the gas turbines 21, 22, and 23, properly decorrelated and therefore output from the preprocessing sub-step 72 described above. In particular, FIG. 4 shows six plotted curves, respectively indicated with the reference numbers 81, 82, 83, 84, 85, and 86.

Just by visual inspection of FIG. 4, it's apparent that curves 84, 85, and 86 all oscillate around a horizontal axis X, namely the abscissa, not departing remarkably from it. The curve 83 shows that in the first part it departs from the X axis, thus showing an anomalous behavior if compared to the other curves 84, 85, and 86; then, when the time goes by, the signal according to this curve 83 goes back to oscillate around the X axis. This may mean that the monitored sensor had a transitory phase at the beginning of the operation, after which it keeps operating correctly. Finally, the curves 81 and 82 depart remarkably from the X axis along the time, showing that the respective sensors they represent the behavior of are having an anomalous operation with respect to those whose operation is represented by curves 84, 85, and 86.

Downstream the preprocessing sub-step 72 of the signals received from the fleet 2, a statistical features extraction 73 is provided, which extracts the features needed to run the anomaly detection and classification steps, which will be better described in the following.

The features extracted are statistical/mathematical parameters. The list of features to be used depends on the type of signal analyzed. Examples of features extracted by the statistical/mathematical features extraction step 73 are median, mean, standard deviation, percentiles, derivatives, kurtosis, skewness, projections on principal components and wavelet decomposition components, and their combinations. Statistics are extracted in one or more defined timeframes, for example a week, a month and so on, and with the sampling rate available from acquisition systems/sensors or defined by the OEM experts.

Then, an anomaly detection sub-step 74 is executed, which identifies if a signal or a group of signals received from the gas turbines 21, 22, and 23 of the fleet 2 has an anomaly or not. In some embodiments this methodology can be performed by machine learning algorithms, implementing supervised and/or unsupervised methodologies. Anomaly detection aims at identifying which signals have an anomalous features pattern with respect to the pattern of the healthy reference features. This detection can be done by using signal reconstruction techniques like AAKR (Auto-Associative Kernel Regression), used in this case to reconstruct the expected signal features with respect to the healthy features pattern available as configuration parameters. The comparison between the reconstructed features and the measured ones is performed by using a distance metric or a similarity metric (likelihood) and comparing them with respect to a threshold, as better explained below.

As it can be seen, the online calculation step 7 performs anomaly detection and classification. Also, it adds an assessment of anomaly severity by distinguishing system and sensor malfunctions, basing on multivariate analysis of different signals anomalies. System anomalies have usually different signature from sensor anomalies and might involve more than one signal. The algorithm is able to recognize several classes of anomalies both for system than sensor behaviors.

For calculating its output by the algorithms mentioned above, the anomaly detection sub-step 74 uses the model configuration parameters CP generated and received by the fleet features extraction sub-step 64 and the anomaly detection and classification training sub-step 65 of the offline training step 6.

After the detection of the anomalies between the signals as disclosed above, there is an anomaly classification sub-step 75. This sub-step 75 identifies if a signal or a group of signals coming from the sensors has an anomaly or not. This methodology can be performed by a supervised approach, tuned by an unsupervised approach.

The detection and classification algorithms are applicable to all the signals, and not to a single signal. The signals acquired online from a dynamic system are defined timeseries. The algorithm processes all the timeseries acquired from the assets in all the operating conditions, like steady state, transients and engine not running conditions.

Also, all the subsystem of the asset are monitored through anomaly detection and classification. In addition, the risk assessment is performed to understand which is the proper timeline for maintenance execution based on the prediction of signals behavior over the future.

The supervised approach can be executed by establishing the features reference pattern of the anomaly classes that have to be detected. The anomaly classes can be selected over historical data or simulated, basing on expert experience. Then the anomaly identification is performed by techniques like multinomial logistic regression, K-NN or Bayesian networks, using respectively a distance metric or a similarity metric (likelihood) and, also in this case, comparing them with respect to a threshold. Among the distance metrics, the Euclidean and the Wesserstein ones can be mentioned. Also, the implementation of a technique is made on the basis of the signal under analysis and processing.

Usually the Wesserstein metric distance is the most recurrent, as it is mainly used for time series; while, for performance calculated parameters, the Euclidean metric distance is usually preferred. As to the similarity metric, it is usually applied for identifying the group of similarities among the turbomachinery assets 21, 22, and 23, for each signal.

The multinomial logistic regression technique is the most used in the current models, because it matches the current performance and accuracy requirements more than other available techniques.

The classes identified are different anomaly types. Here, by way of example, it's listed a set of classes that can be identified: signal freezing, signal drift, step-change, symmetric noise, asymmetric noise, spikes, and abnormal range.

The unsupervised approach can be executed to check periodically the accuracy of the classifier in order to establish if anomaly classes are stable and/or if new anomaly type has to be added to the class list. The clustering will be executed on the features extracted over the last timeframes (number of timeframes can be any). If clusters are centered with respect to anomalous/healthy clusters assigned during model setup, the model is stable and no update is needed; otherwise a new model setup will be executed. Clustering techniques that can be used are several. In particular, in some embodiments the Expectations Maximization clustering technique is used, which is usually applied because it better adapts to the statistical distribution of the signals received and to be processed, thus optimizing the model accuracy, thereby reducing the overall errors. In other embodiments also the k-Means clustering technique can be applied for signal with similar and symmetric statistical distribution.

The anomaly classes identified will be then associated to the asset they refer to; in particular, the classification will lead to assign the anomaly to a sensor malfunction or a system/asset malfunction. The assignment will be executed by a logic flow diagram defined by the OEM experts. For example, for a certain signal, an anomaly classified as signal freezing or noise will be assigned to a sensor malfunction; while an anomaly classified as drift will be assigned to a system malfunction. These two macro anomaly classes will be then processed differently on the flow chart illustrated in FIG. 3.

In other words, in the embodiment, the anomaly classification sub-step 75 may have two different outcomes in case system anomalies (drift or anomalous range/value) or sensor anomalies, such as freezing, noise, etc. . . . . In the embodiment described, for each of the two possible outcomes a different processing procedure is executed. In this way, the maintenance optimization method 5 allows to differentiate the faults or anomalies, for accordingly differentiating maintenance dispositions and the maintenance operations to be carried out.

In particular, in case of the anomaly classification 75 detects a system anomaly, a risk assessment step 761 is carried out. This risk assessment step 761 estimates the risk of any event that requires a maintenance task to be executed at unit (namely, the turbomachinery 21 or 22 or 23 of the embodiment illustrated) shutdown. The event categories associated to the gas turbines 21, 22, and 23 are several: trip, engine shutdown, performance degradation, unplanned maintenance, and unplanned engine/component replacement. The risk of each event is evaluated in terms of probability and impact.

This risk assessment step 761 combines the risks of systems malfunction, assets degradation and parts/material aging. The risk assessment is done by evaluating these phenomena in terms of their impacts on the assets unavailability events listed before. The weights and combinatorial criteria used to perform the risk assessment are based on OEM experience and design models. The risk models can be physics-based, data-driven or a mixed type and their development, validation and update is based on test data, online monitoring data and inspection findings/measures.

The inputs of the risk assessment step 761 software block or module are the signals identified as affected by system anomalies, all the other signals needed to run the risk assessment and the signals affected by sensor anomalies impacting maintenance scope/date.

Figure 5:
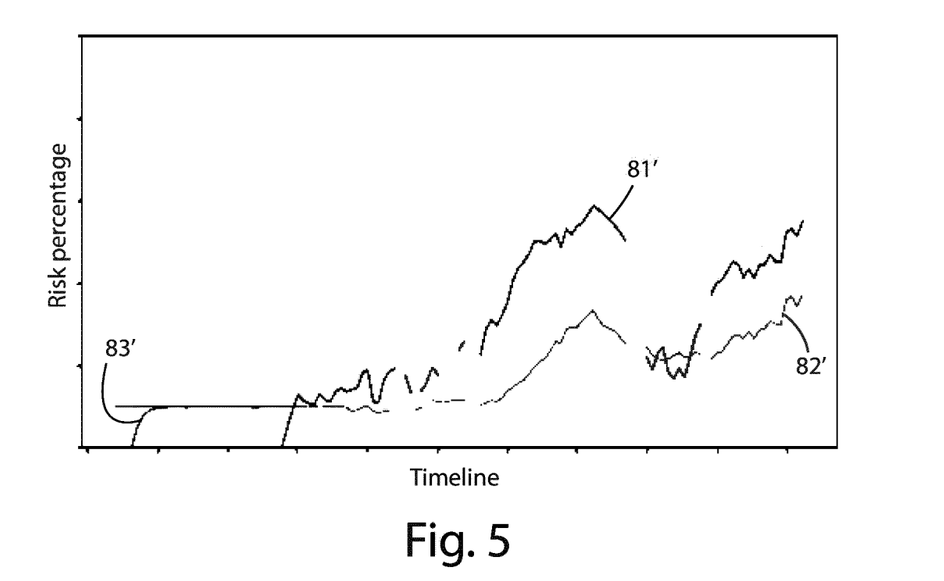
FIG. 5 illustrates a representative set of curves representing processed signals from sensors installed on turbomachinery equipment of FIG. 1 that depart from routine operational behavior.

Referring now to FIG. 5 and also to FIG. 4, it can be seen an example of the outcome of the risk assessment sub-step 761 after processing the signals received from the gas turbines 21, 22, and 23. More specifically, it can be seen that from the signals 84, 85, and 86 no anomalies have been detected and then no maintenance issues arise from the sensor they derive. Instead, the risk assessment sub-step 761 generates the curves 81', 82', and 83' corresponding to the curves 81, 82, and 83, which, as mentioned above, depart from the behavior of the other curves, and in particular, for this embodiment, depart from the X axis. The curves 81', 82', and 83' strengthen the different behavior of the same, if compared with the other curves.

In this way, it is emphasized the anomalous behavior of curve 83' in the first part of the detection timeframe. In the same way, the anomalous behavior of curves 84' and 85' can be appreciated in the final part of the detection timeframe.

Then, after the risk assessment step 761, a model forecast and date to maintenance sub-step 762 is carried out, which estimates the time to maintenance based on forecast analysis on each model and their combination. The forecast can be done by time-series forecast techniques or probabilistic forecast based on aging parameters. Maintenance date is estimated by calculating when total predicted risk is expected to reach a certain limit value.

Finally, a maintenance disposition sub-step 78 is executed, whereby actions to be executed at unit shutdown and/or at unit running are set out and shown on a monitor (not shown in the Figures) or provided in general to the user by any other suitable device for listing the appropriate maintenance operation.

More specifically, the maintenance disposition step 78 defines maintenance and/or risk mitigation actions to be performed, differentiating those that can be executed at unit running and those to be executed at next shutdown.

The list of maintenance actions to be executed are based on the anomalies identified and the risk assessment, and the maintenance dispositions are prioritized with respect to the ranking/contribution within the risk assessment of their related system/asset anomaly.

In some embodiments, the mapping between the anomaly/aging/degradation phenomenon and the proper maintenance action is build basing on OEM experience and maintenance policies.

In case of the anomaly classification 75 detects a (or at least one) sensor malfunction, a severity assignment 771 step is executed, where a severity is assigned to the anomalies identified as sensor malfunctions. The severity assignment 771 assigns a severity score to anomalies classified as sensor malfunction basing on anomaly type and time lasting and sensor redundancy. Example of anomalies can be for example, signal freezing, noise and peaks will be prioritized differently: freezing is considered more severe than noise, because it leads to a missing monitoring of an item. Also, frequency and time lasting of an anomaly will be considered to evaluate the severity. Severity can be a percentage value or an integer value range (0-10) or whatever other ranking system able to prioritize the severity of events.

Eventually, it is checked if the outcome of the severity assignment step 771 impacts the maintenance scope or date (see sub-step 772). More specifically, in this step it is mapped if the corrective or risk mitigation action can be executed online or it requires an engine shutdown. The mapping function, depending on anomaly type, signal type and severity, is coming from OEM experience and maintenance policies.

If said outcome of the severity assignment step 771 impacts the maintenance scope or date, then a risk assessment step 761, already described above, is executed. Otherwise, if there is not any impact, the maintenance disposition step 68, also described above, is executed.

The maintenance optimization method/algorithm 5 is able to process all the turbine monitoring signals of an entire fleet. Then the maintenance optimization method/algorithm 5 starts from processing input timeseries.

Also, the maintenance optimization method/algorithm 5 is a predictive maintenance solution. Maintenance planning is dynamic, as it is based on the evolution of signals over time.

The advantage of the maintenance optimization method 5 is that this approach merges OEM maintenance service knowledge and digital service provider capabilities. Technically this is done by merging functional/physics knowledge of failure mode modeling and data-driven analytics developed over fleet monitoring data and inspections experience.

The commercial advantage is that the merge of OEM physics models with data-driven analytics allows to optimize the maintenance scenario with respect to customer requirements: max reliability/availability, minimize outage duration, optimize outage scope of work, and maximize maintenance cycle time, minimizing the risk of critical failure. This flexibility is the advantage that assets OEM can have being the owner of technology design, of online monitoring data and of historical failure statistics and inspections finding.

The various arrangements and steps illustrated in FIG. 3 can be variously combined to one another. In particular, some common steps of the offline model setup step 6 and of the online calculation step 7 can be executed by the same software block or module.

While aspects of the invention have been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A computer-implemented method for maintenance optimization of a fleet or group of plants, wherein the plants comprise one or more turbomachinery assets, wherein each turbomachinery asset comprises a turbomachine and related auxiliary systems, and wherein each of the turbomachinery assets comprises one or more installed sensors, each installed sensor capable of generating operating signals of the turbomachinery assets, the method comprising the steps of:
calculating model configuration parameters by comparing healthy conditions and unhealthy conditions of the turbomachinery assets found in historical fleet data;
acquiring data constituted by operating signals from the sensors of the turbomachinery assets within a defined timeframe;
filtering and decorrelating the operating signals to remove correlation between operating signals from different systems, resulting in a decorrelated signals;
extracting features from the decorrelated signals;
using a multivariate problem approach, comparing the features to the model configuration parameters to identify one or more anomalies in the features;
using a classifier,
establishing anomaly classes for the anomalies and associating the anomaly classes to the turbomachinery assets of the fleet they refer to; and
classifying the anomalies according to the class as system anomalies, which are system malfunctions or degradations related to the turbomachinery assets of the fleet, or into sensor anomalies, which are sensor malfunctions,
wherein,
if system anomalies, then executing a risk assessment for estimating the risk of any event that requires a maintenance task and a proper time for the maintenance task to occur,
else, if sensor anomalies, then executing a severity assessment for assigning a severity to the anomalies identified as sensor malfunctions;
using the severity, assigning maintenance dispositions for the maintenance tasks;
generating a file that includes the maintenance dispositions; and
sending the file to an end user,
wherein the anomaly classes are selected from historical data or by expert knowledge, and
wherein the anomaly classes are selected from among the following:
signal freezing, step-change, symmetric noise, asymmetric noise, spikes, abnormal or anomalous range, or drift.

2. The method of claim 1, wherein the anomaly detection step is performed by machine learning techniques with supervised and/or unsupervised approach, wherein in the supervised approach the anomaly detection is performed by the comparison of the features extracted on acquired/calculated parameters with healthy reference signal features.

3. The method of claim 1, wherein the comparison of the features extracted on acquired/calculated parameters with healthy reference signal features is carried out by using signal reconstruction techniques.

4. The method of claim 3, wherein the signal reconstruction technique is performed by AAKR (Auto-Associative Kernel Regression) technique, wherein the anomaly is identified when the distance between the reconstructed features and the healthy features is above a relevant threshold that is one of the model configuration parameters, wherein the metrics used for the features comparison are Euclidean distance or Wesserstein distance or likelihood metric.

5. The method of claim 1, wherein said acquisition step comprises the steps of:
receiving input signals from the turbomachinery assets of the fleet to be monitored and maintained, calculating one or more additional parameters to assess the health status of the turbomachinery assets, selected from: performances, emissions, components degradation; and
preprocessing the signals received from the turbomachinery assets and the other calculated additional parameters to assess the health status of the turbomachinery assets, wherein a filtering and/or signal decorrelation processing is executed, to obtain normalized signals with respect to specific asset operating conditions.

6. The method of claim 1,
wherein the risk assessment step estimates the risk of any event that requires a maintenance task to be executed at one of the turbomachinery asset, and
wherein the method comprises the step of forecasting to estimate the time to maintenance through a forecast analysis based on time-series forecast techniques or probabilistic forecast based on aging parameters extrapolation.

7. The method of claim 1, wherein a severity assignment step to assign a severity score to anomalies classified as sensor malfunction basing on anomaly type and time lasting and sensor redundancy is executed.

8. The method of claim 1, comprising the step of establishing if sensor malfunction is impacting maintenance scope or date,
wherein, if the outcome of the severity assignment step executed on the sensor anomalies impacts the maintenance scope or date, then the risk assessment step is executed.

9. The method of claim 8, wherein the events that require a maintenance task to be executed at one of the turbomachinery assets comprise the events reducing asset availability, including at least one of the following: trip, unplanned shutdown, systems malfunction, assets degradation and parts/material aging, performance degradation, engine/component failure.

10. The method of claim 1, wherein the model setup step for the calculation of model configuration parameters is executed offline.

11. The method of claim 1, wherein the model setup step comprises the steps of:
- receiving input signals from the turbomachinery assets of the fleet to be monitored and maintained;
- calculating any parameters required to describe the health status of the assets, including performances, emissions, components degradation; and
- preprocessing the signals received from the turbomachinery assets and the calculated parameters, wherein a filtering and/or signal decorrelation processing is executed, to obtain normalized signals with respect to specific asset operating conditions.

12. The method of claim 11, wherein the model setup step comprises the steps of:
- identifying group of similarities among the turbomachinery assets of the fleet, carried out by clustering techniques using distance or similarity metrics to operating signals and parameters of all the assets in the fleet; and
- carrying out a group features extraction step, comprising the sub-steps of:
  - identifying timeframes, over which assets operate as expected, and calculating the healthy features on every identified similarity group of the turbomachinery assets, and extracting healthy statistical/mathematical features or parameters within at least one timeframe,
  - identifying timeframes over which assets operate anomalously and calculating the anomalous features on every identified similarity group of the turbomachinery assets, extracting anomalous statistical/mathematical features or parameters within at least one timeframe, wherein in case no sufficient number and types of anomalies are identified over the signal historical trends, the anomalies are emulated and injected within the signal trends and the anomalous features extraction step is performed among the timeframes over which anomalies have been injected; and
- training the anomalies identification and classification step, which are respectively signal reconstruction AAKR and multinomial classification models;
- wherein the configuration parameters are constituted by healthy and anomalous features extracted within the timeframes over which the model setup step is executed and settings parameters of identification and classification models trained within model setup step.

13. The method of claim 12, wherein the statistical/mathematical features or parameters are median, mean, standard deviation, percentiles, derivative, kurtosis, skewness, projections on the principal components and wavelet decomposition components obtained from a spectrum analysis, and their combinations.

* * * * *